C. H. SIMMONS.
VALVE.
APPLICATION FILED JUNE 14, 1909.

1,020,374.

Patented Mar. 12, 1912.

Witnesses
A. I. Dimond.
E. A. Volk.

Inventor
Charles H. Simmons,
By Wilhelm, Parker & Ward,
Attorneys.

UNITED STATES PATENT OFFICE.

CHARLES H. SIMMONS, OF CHICAGO, ILLINOIS, ASSIGNOR TO THE C. H. S. COMPANY, OF YORKVILLE, ILLINOIS, A CORPORATION.

VALVE.

1,020,374.  Specification of Letters Patent.  Patented Mar. 12, 1912.

Application filed June 14, 1909. Serial No. 501,970.

*To all whom it may concern:*

Be it known that I, CHARLES H. SIMMONS, a citizen of the United States, residing at Chicago, in the county of Cook and State of Illinois, have invented a new and useful Improvement in Valves, of which the following is a specification.

This invention relates to that class of valves for use on steam radiators and for other purposes in which the valve stem has a rotary movement only and in which leakage of the steam or other fluid around the valve stem is prevented without the use of a separate packing and which are usually designated as packless valves.

The invention has reference more particularly to a valve in which the stem is packed by means of an outwardly tapering surface formed on the stem and pressed against a correspondingly shaped socket or cavity in the dome or bonnet of the valve casing.

The object of this invention is to improve valves of this general character with a view of maintaining a tight joint around the valve stem by a simple, efficient and durable construction which while preventing leakage permits the valve stem to turn freely or with little friction.

Figure 1:
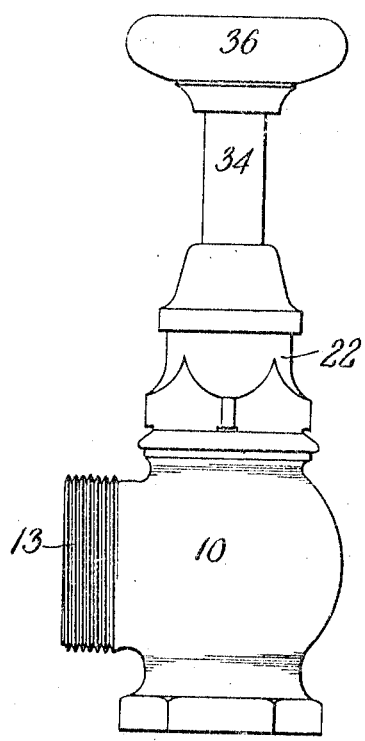
Figure 2:
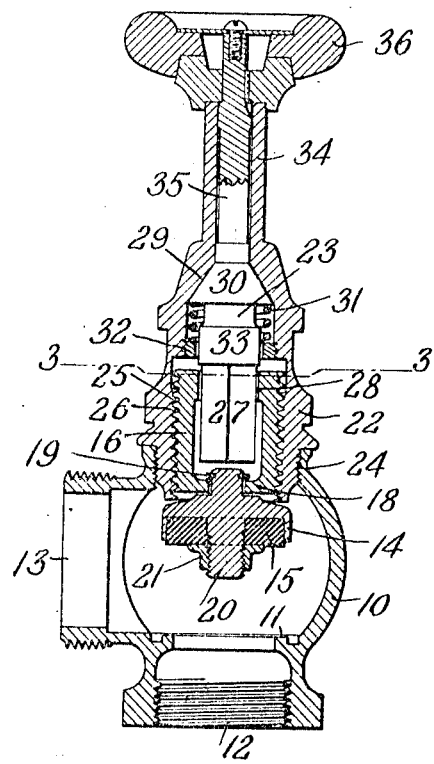
Figure 3:
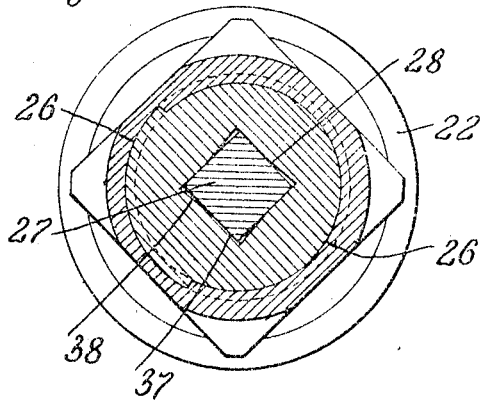
Figure 4:
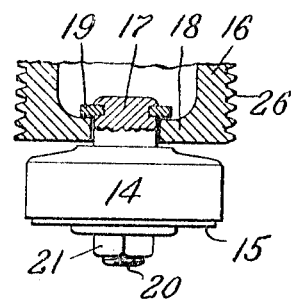

In the accompanying drawings: Figure 1 is an elevation and Fig. 2 a vertical section of a valve embodying this invention. Fig. 3 is a horizontal section, on an enlarged scale, on line 3—3, Fig. 2. Fig. 4 is a fragmentary sectional elevation showing the attachment of the valve disk to the screw-threaded carrier by which the disk is moved toward and from the valve seat.

Like reference characters refer to like parts in the several figures.

10 represents the body of the valve casing provided with an annular valve seat 11 and on opposite sides of said seat with screw-threaded tubular portions 12, 13, for connection with pipes or other passages for the steam or other fluid.

14 represents the rigid valve disk provided with an annular facing 15 of rubber or other suitable material adapted to seat itself tightly upon the valve seat 11.

16 represents the valve carrier which is movable toward and from the valve seat and to which the valve disk is attached by a swiveling connection of any suitable construction, comprising, preferably, a short stem 17 which extends upwardly from the disk through an opening in the bottom 18 of the carrier in which the stem is rotatably held by a washer 19 bearing upon the bottom and secured to the reduced upper end of the stem 17 by the headed upper end of this stem. Access can be had to the upper end of the stem 17 from the open upper end of the carrier. This swiveling connection of the valve disk with the carrier is simple, durable and permanent. The annular facing 15 is preferably secured to the valve disk by means of a stem 20 extending downwardly from the disk and a screw nut 21 applied to the threaded lower end of this stem.

22 represents the dome or bonnet of the valve casing in which the carrier 16 and the valve stem 23 are arranged and which is secured to the body 10 by a screw joint 24. The lower part of this bonnet is provided with an internal screw-thread 25 in which the external thread 26 of the carrier works. The shank 27 forming the lower or inner portion of the valve stem is angular, preferably square, and extends into the cavity of the carrier, which latter is provided in its upper portion with an angular socket or opening 28 in which the shank 27 fits, so that a rotary movement of the valve stem causes a rotary movement of the carrier which in turn causes the carrier to move to or from the valve seat.

The middle portion of the bonnet 22 is provided with an upwardly or outwardly tapering cavity or seat 29 for the reception of a correspondingly tapering collar or packing surface 30 formed on the valve stem. The tapering surfaces of the seat and collar are ground upon each other so as to form a tight joint which prevents leakage of the fluid along the stem. The stem is pressed with this tapering packing surface against the tapering seat by a spiral spring 31 which rests upon a bushing, washer or annular support 32 removably secured in the bonnet 22 by a screw-thread or other suitable means. This washer or bushing has preferably a cylindrical bore and forms a guide for the adjacent cylindrical portion 33 of the stem. The top or outer part 34 of the bonnet forms a cylindrical guide for the upper part 35 of the valve stem which may be reduced between its ends to reduce the extent of the contact surfaces 36 represents the hand wheel or other device of any suitable construction secured to the exposed end of the valve stem for manipulating the same.

The bonnet is an integral structure containing the internal thread for the carrier 16, the internal thread for the removable spring support 32, the tapering seat 29 for the tapering packing surface on the valve stem, and the cylindrical guide 34 for the outer portion of the latter. These several interior portions of the bonnet can therefore all be readily formed exactly in line with each other or concentric with the true axial line of the stem, whereby a close fit of the parts is secured in a very simple and inexpensive manner and binding is avoided, while the stem is enabled to turn freely. The stem is inserted into the bonnet from below, the bonnet itself containing no joint which might require to be packed or cause leakage. The spring is inserted also from below and the spring support is inserted from below and secured in the bonnet thereby connecting the stem with the latter. The pressure exerted by the spring against the stem can be regulated by adjusting the spring support. When the valve stem, the spring and the spring support have been attached to or secured in the bonnet, these parts form a unitary structure which can be handled and shipped complete and without danger of having the adjustment or relative position of the parts disarranged by unskilful or inexperienced persons in using the structure or applying the same to the valve casing. If desired, the spring support can be further secured in position by jamming or punching the attaching screw-threads after the support has been screwed into the bonnet and properly adjusted. An easy and at the same time steam and air-tight working is by this means attained in this improved valve in a very simple, inexpensive and durable manner, thereby preventing the escape of steam or water when the valve casing is under pressure, or the entrance of air when the same is exhausted.

The sides of the angular socket or opening 28 in the carrier are preferably each composed of two faces or portions 37, 38, Fig. 3, which stand at an obtuse angle to each other, presenting the vertex inwardly or converging inwardly. This enables each side of the angular shank 27 of the valve stem to take a flat bearing against one face of the contiguous side of the socket or opening, instead of the shank bearing against the socket with its edges only, as would be the case when considerable play or clearance exists between the shank and the side of the socket.

I claim as my invention:

1. The combination with a valve casing, of a bonnet having the inner portion of its cavity enlarged for the insertion of a spring and spring support from the inner end of the bonnet and provided with an internal screwthread for engagement with an externally threaded valve carrier, said cavity being further provided outwardly of said carrier thread with an internal screwthread of less diameter for receiving a spring support, and outwardly of the last mentioned screwthread with an outwardly tapering packing seat, of an externally threaded spring support adapted to be inserted through the inner end of said cavity and secured in said supporting thread, a valve stem provided with a tapering portion fitting rotatably in said seat, and a spring resting on said support and pressing said stem outwardly, substantially as set forth.

2. The combination with a valve casing, of a bonnet having the inner portion of its cavity adapted for the insertion of a spring and spring support from the inner end of the bonnet and having an internal screwthread for the reception of such spring support and an outwardly tapering packing seat arranged outwardly of said screw-threaded portion, a valve stem provided with a tapering portion fitting rotatably in said seat, an annular spring support having an external screwthread engaging the internal thread of the bonnet, said threads being exposed and accessible at the inner end of the bonnet, and a spring resting on said support and pressing said stem outwardly, substantially as set forth.

3. In a valve, the combination with a valve stem having an angular shank, of a valve carrier having an angular socket, the sides of which are formed each by two inwardly converging faces for engagement with the sides of the shank, substantially as set forth.

Witness my hand in the presence of two subscribing witnesses.

CHARLES H. SIMMONS.

Witnesses:
JOHN C. MATHEWS,
W. F. KLEMP.